United States Patent
Sumi et al.

[11] Patent Number: 5,845,006
[45] Date of Patent: Dec. 1, 1998

[54] METHOD OF PROCESSING IMAGE FORMATION

[75] Inventors: Yasushi Sumi; Fumiaki Tomita, both of Tsukuba; Yutaka Ishiyama, Yokohama, all of Japan

[73] Assignee: Jiro Hiraishi, Tokyo, Japan

[21] Appl. No.: 683,708

[22] Filed: Jul. 18, 1996

[30] Foreign Application Priority Data

Jul. 19, 1995 [JP] Japan .................................. 7-182795

[51] Int. Cl.[6] .............................. G06K 9/00; G06K 9/34
[52] U.S. Cl. ......................... 382/154; 382/107; 382/173
[58] Field of Search .................................. 382/107, 154, 382/173

[56] References Cited

U.S. PATENT DOCUMENTS

| | | | |
|---|---|---|---|
| 4,232,968 | 11/1980 | Kempf | 356/393 |
| 5,202,928 | 4/1993 | Tomita et al. | 382/173 |
| 5,625,702 | 4/1997 | Kamada et al. | 382/107 |

*Primary Examiner*—Leo H. Boudreau
*Assistant Examiner*—Daniel G. Mariam
*Attorney, Agent, or Firm*—Gifford, Krass, Groh, Sprinkle, Patmore, Anderson & Citkowski, P.C.

[57] ABSTRACT

A method of processing image information is disclosed, for detecting the movement of an object with a simplifed system structure, and high speed treatment. The method is comprised of the steps of entry of a stereoscopic image of an object, extraction of edges of the object, and dividing it into segments based on the local feature of the image. On each segment, tracing points (sampling points) are selected, the inter-frame correlation of selected points is obtained, the three-dimensional coordinates of the points are measured, and thus the position and attitude of the object are detected, wherein the inter-frame correlation is performed by evaluating the similarity between frames based on correlation between the tangential direction of tracing points and the luminance value of the surface.

3 Claims, 9 Drawing Sheets

METHOD OF PROCESSING IMAGE FORMATION

BACKGROUND OF THE INVENTION

1. Field of the Invention

The present invention relates to a method of processing image information for recognizing the movement of an object on the basis of frame images time-sequentially obtained from the object.

2. Brief Description of the Prior Art

In recognizing the movement of an object, for example in a process of arbitrary detecting the position and attitude of a three-dimensional object, the time-sequential images are continuously obtained from the image recording means such as from a visual sensor. In general, there are known three methods for detecting the movement, including position and attitude, of an object from such time-sequential images as shown below:

(1) A method applicable for a miniature object between two images, wherein an equation for determining the movement of an object is introduced on the basis of the spacial change of brightness of the image and a time-based change of the continuous images;

(2) A method applicable for a large object between two images, wherein each pair of points which represents the same point to each other is obtained, and (3) A method of utilizing three-dimensional spacial images which are formed by time-sequentially superimposing a plurality of time-sequential images. Since the movement of the object between adjacent images is minute, it is easy to obtain the correlating points, therefore, by tracing in timing order, it is possible to obtain the correlating point having a great shifting rate.

The conventional image processing method using time-sequential images to detect the movement of an object can be easily affected by noises and is difficult than the stereoscopic correlating treatment, and a large amount of data storage is needed.

SUMMARY OF THE INVENTION

In view of the above-mentioned problems, it is an object of the present invention to provide a method of processing image information which is performed with a simple system, capable of high speed processing, and a large amount of image data is not required to be stored.

Accordingly, the present invention is to provide a method of processing image in formation for recognizing the movement of an object on the basis of frame images obtained in time series manner from the object comprising the steps of:

entering stereoscopic or -graphic images of the object;

extracting edges of the object from such stereoscopic images;

on the basis of local features, dividing the images into segments, selecting tracing points on the segment, determining correlation between frames of tracing points; and detecting position and attitude of said object on the basis of three-dimensional coordinates of said object before and after movement of the correlating points.

In addition, in the aforementioned method, correlation between frames is adapted to be performed by evaluating the similarity between frames based on the correlation of the contacting direction of the tracing points with the luminance value of the surface.

Also, in the method above, the three-dimensional coordinates of correlating points are adapted to be measured by way of stereoscopic viewing using stereo correlation or merely of single-eyed viewing.

DETAILED DESCRIPTION OF THE PREFERRED EMBODIMENTS

Figure 1:
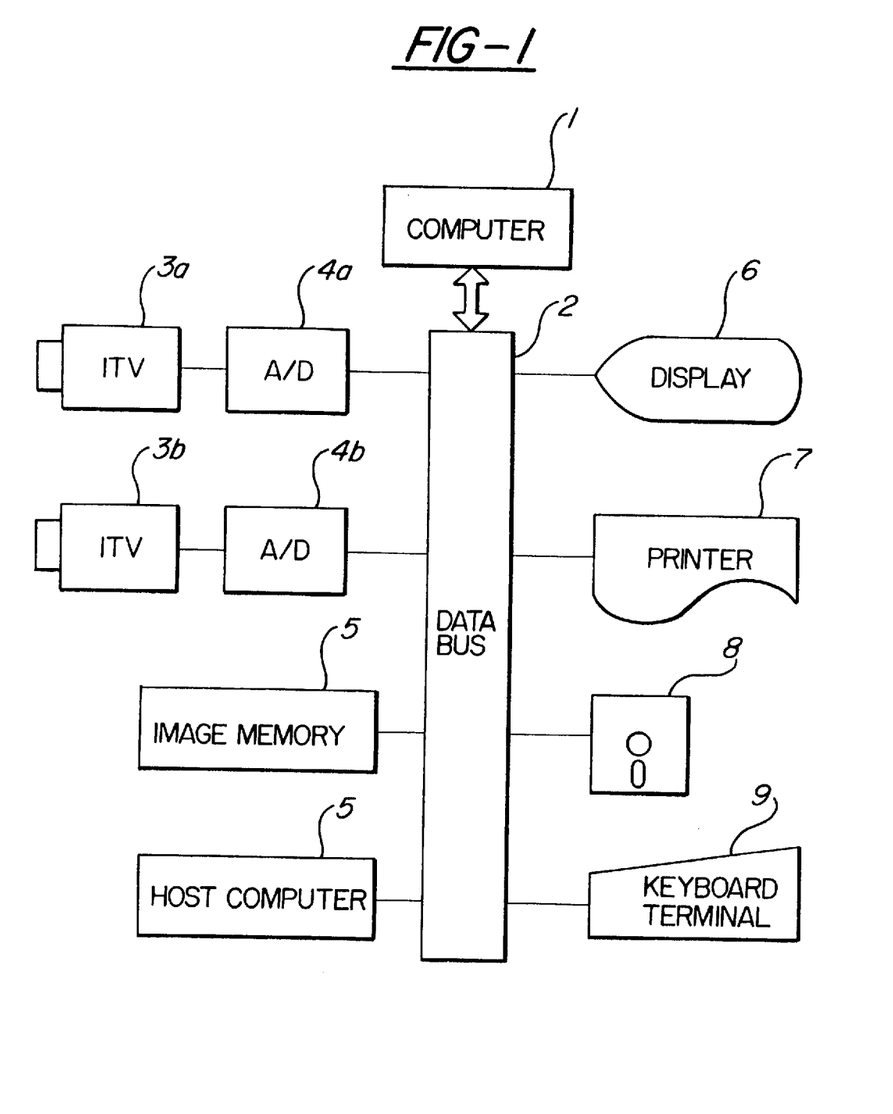
FIG. 1 is a block diagram illustrating a system structure according to an embodiment of the invention.

Referring to FIG. 1, FIG. 1 is a block diagram illustrating the system scheme in use for the image processing method, including a computer 1 for controlling the entire system, which is connected through the data bus 2 to each component.

Analog output signals produced from television cameras 3a and 3b are converted to digital signals in A/D converters 4a and 4b, and sent through data bus 2. Further shown in FIG. 1 are an image memory 5 for storing the image data obtained by television cameras 3a and 3b, a display 6 for displaying images, a printer 7, a floppy disc 8 for storing image data, and a keyboard terminal 9. The system is further connected to an external host computer.

Figure 2:
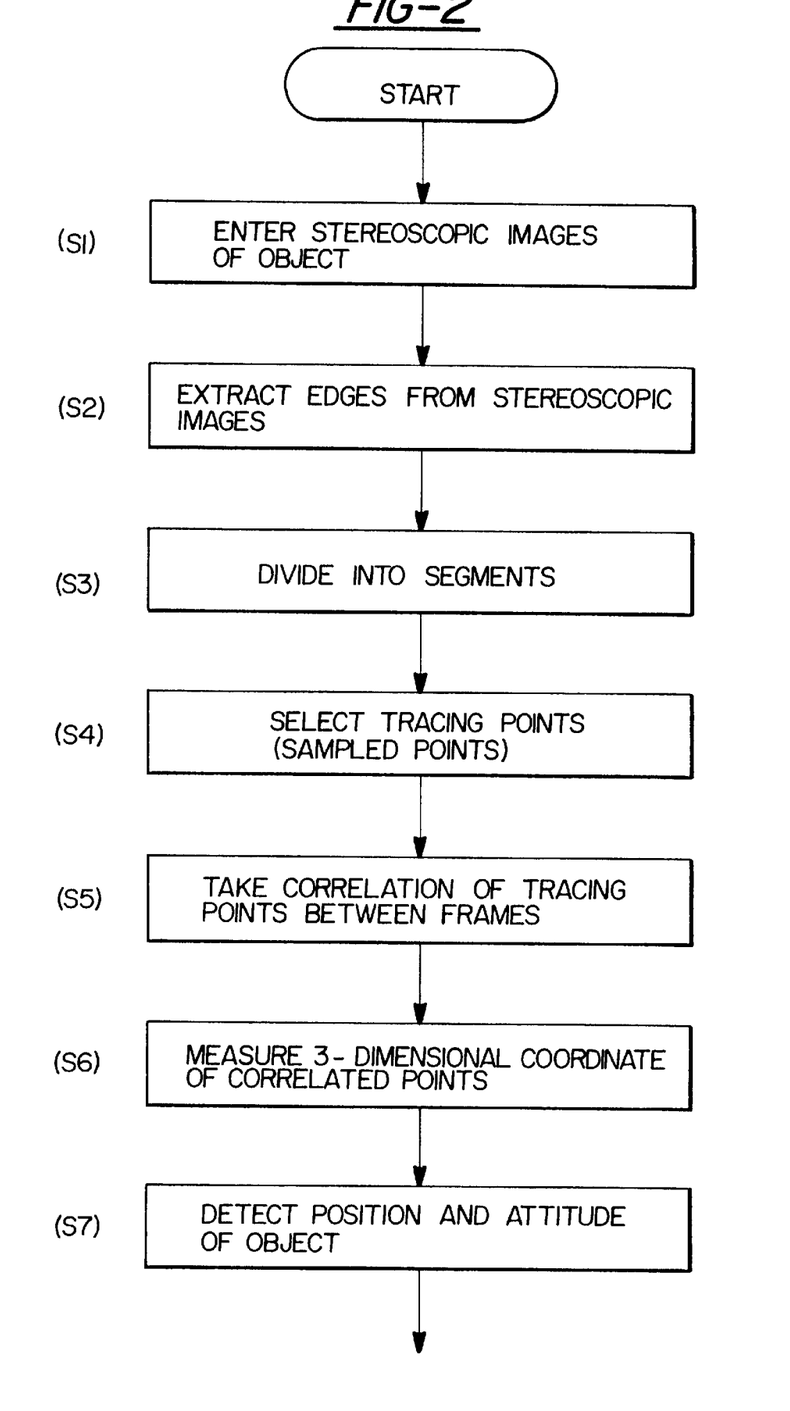
FIG. 2 is a flow chart showing the fundamental treatment of the invention.

FIG. 2 shows a flow chart illustrating fundamental treatments which includes a flow of treatment for recognizing the movement of the object based on frame images of the object.

The stereoscopic image of an object is entered (Step S1), from which the stereoscopic image of the edges of the object are extracted at S2; edges are divided into segments in accordance with their local features at S3; tracing points (sampling points) are selected at S4; the inter-frame correlation of selected tracing points is obtained at S5; three-dimensional coordinates of correlated points before and after their movement are measured at S6; and position and attitude of the object are detected at S7.

Figure 3:
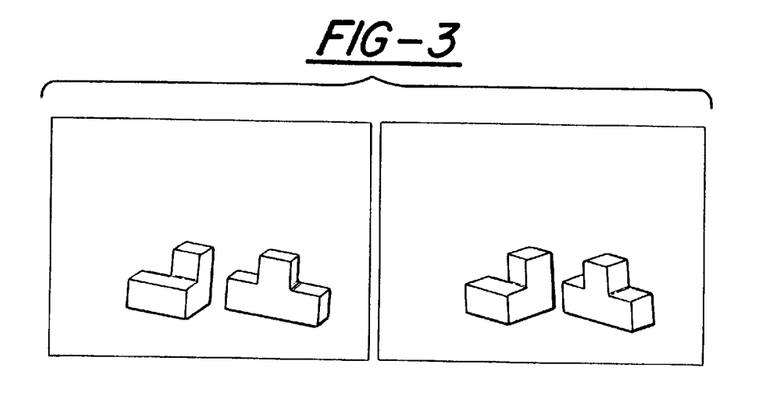
FIG. 3 is a view of a set of stereoscopic images.

The flow of treatment is described in detail with reference to FIG. 3–FIG. 16. From a stereoscopic image of an object as shown in FIG. 3, edges of the object are first extracted and are divided into a plurality of segments with reference to characteristic points (such as branches, inflections, indentations or transitions). The result is maintained in the form of a boundary representing (B-REP) data structure, which is also of a topologically represented graphic structure in which "regions", "boundary lines", "segments" and "points" are correlated with each other as its components.

Figure 4:
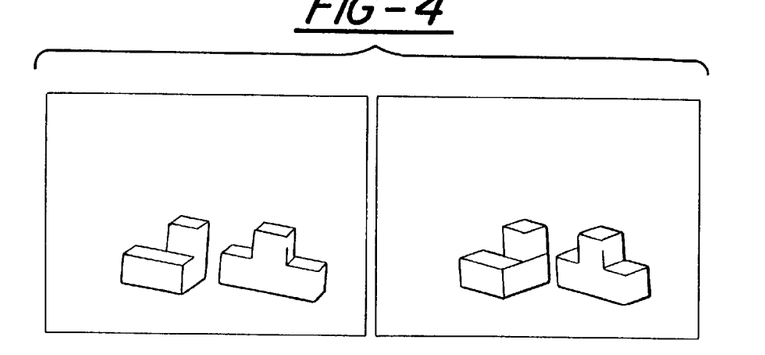
FIG. 4 is a boundary representation of stereoscopic images of FIG. 3.
Figure 5:
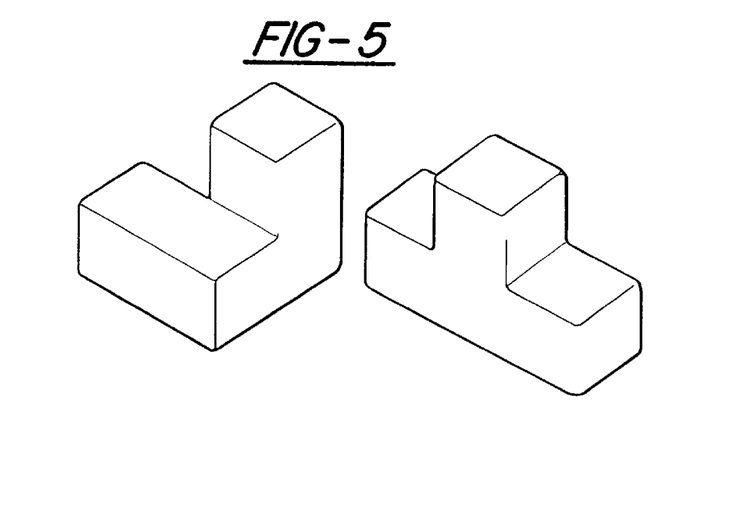
FIG. 5 is a three-dimensional information of an object.

FIG. 4 illustrates the points array of the B-REP, and FIG. 5 illustrates the three-dimensional information obtained from B-REP of the left and right images, using the segments as correlated units of stereoscopy.

Next, in order to perform object tracing, by identifying the object to be traced from the object model, it is necessary to find the position and attitude information. Such an object model has a number of sample points spaced with an equal distance therebetween along each segment. On each of the sample points, information relating to geometrical features of the object exists, from which information the positional alignment is performed and the position and attitude thereof is detected.

Figure 6:
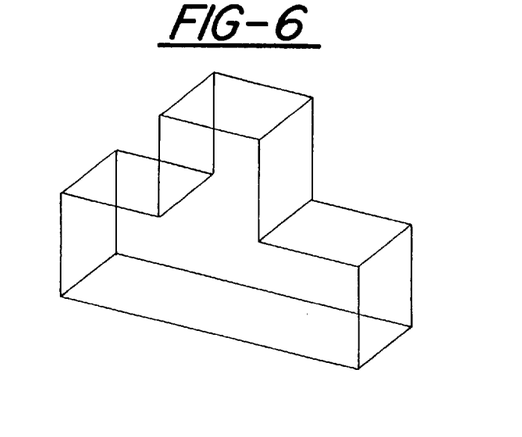
FIG. 6 is a perspective view of an object model.
Figure 7:
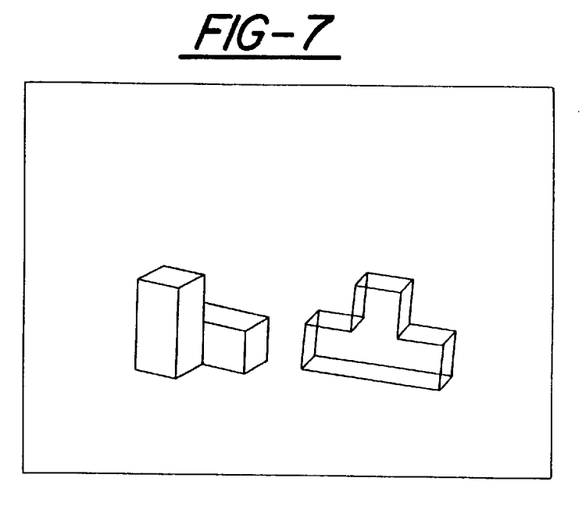
FIG. 7 is a perspective view of an object model after it is positionally aligned.

FIG. 6 illustrates the prepared object model of building blocks, and FIG. 7 shows the result of object recognition after positional alignment of the object model of the building blocks.

The process of object tracing includes the steps of, in taking consideration of tracing points along edges, obtaining inter-frame correlation of tracing points based on their local features, calculating motional parameters based on the three-dimensional coordinates P(t) before movement of correlated points and three-dimensional coordinates P(t+1) after movement of the points and, from time to time, detecting the position and attitude of the object using the following formula:

$$P(t+1) = RP(t) + T$$

where R is 3×3 matrix representing the rotational component, and T is 3×1 matrix representing the translational component of the movement.

Each of treatments are described hereinafter in sequence.

(1) Initial Setting

Figure 15:
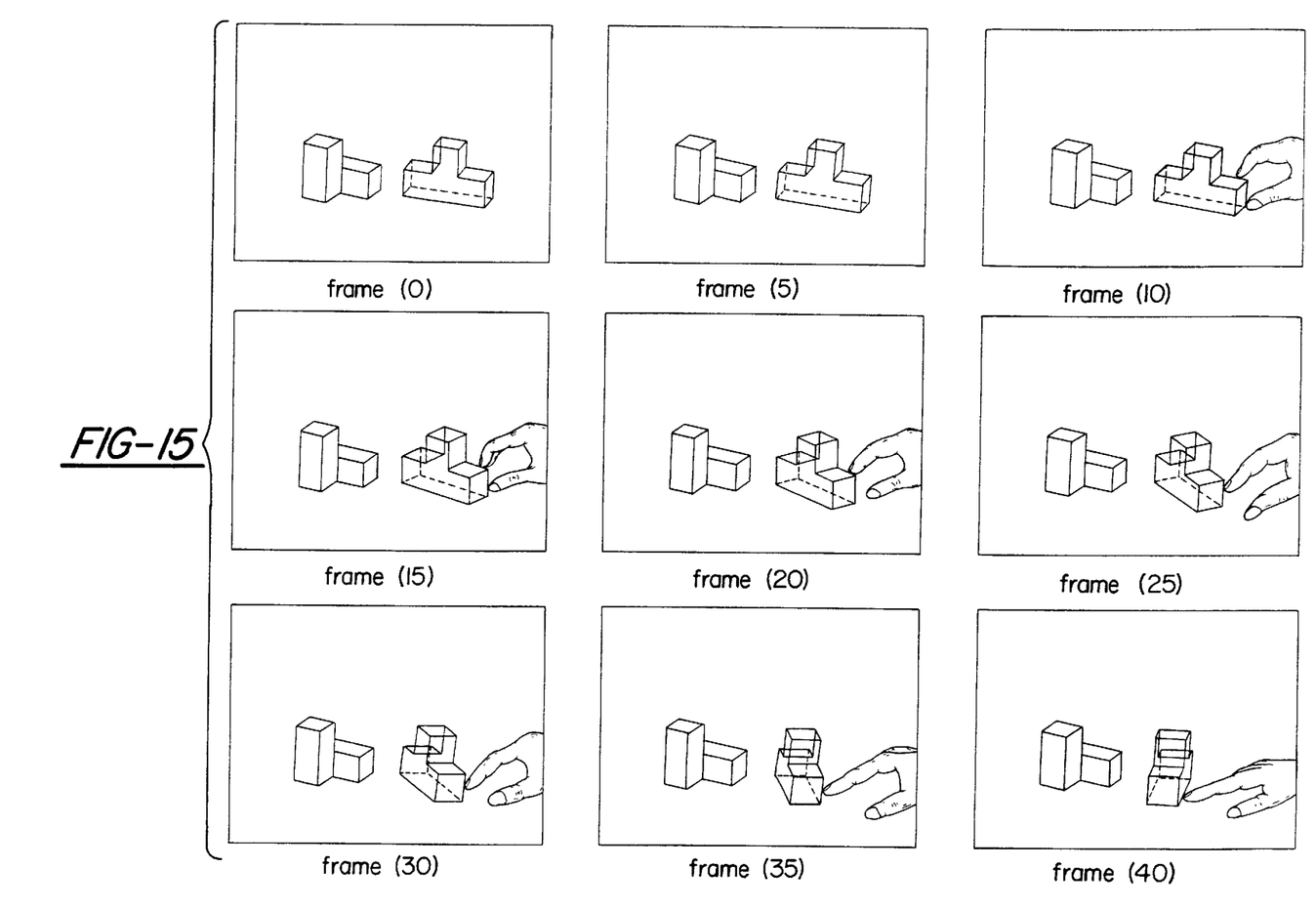
FIG. 15 is a view showing the result of tracing of building blocks.

In an initial frame (0) in FIG. 15, the following information relating to position/attitude of the traced object obtained from the result of object recognition is stored as the initial value.

A. Apex information

The information including the three-dimensional coordinates together with segment numbers one of which forming the normal direction and the other forming its apex is defined as the "Apex information".

B. Sample point information

Figure 8:
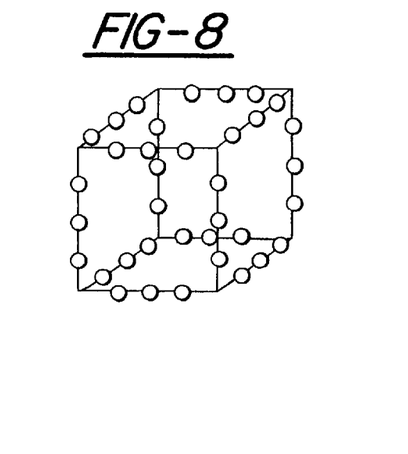
FIG. 8 is a perspective view illustrating representative points along each of the segments.

As shown in FIG. 8, sample points on each segment, which have been used in the object recognition step, are selected with an equal space between these and these are nominated "representative points".

(2) Selection of Tracing Points

Based on apex vectors Vn obtained from three dimensional coordinates and normal direction of each apex as well as radial vectors $C_L$ and $C_R$ of each of left and right cameras obtained from camera parameters, each of internal products is calculated using the following formulas and observable apices are selected from the left and right cameras.

$$\cos^{-1}\{(Vn.C_L)/(|Vn||C_L|)\} > \pi/2$$

$$\cos^{-1}\{(Vn.C_R)/(|Vn||C_R|)\} > \pi/2$$

Figure 9:
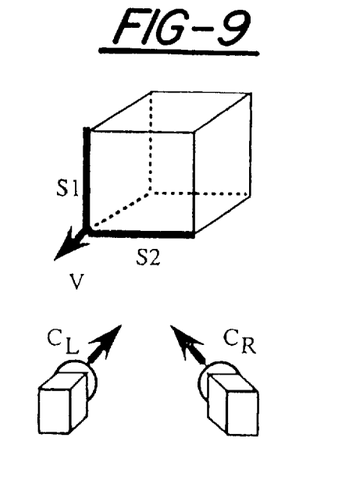
FIG. 9 is an illustrative view of observable apices.

As shown in FIG. 9, the apex vector V is the apex determined as an observable apex on the basis of the internal product calculation. Then, the segment numbers forming the apex are examined. In the case of apex V, such numbers are assigned S1 and S2. Such a treatment is performed for all apices of object models, and observable segments are listed up. Among the selected list, when the segment has both one surface and an opposite surface, either one is selected and the other surface is removed from the list.

Figure 10:
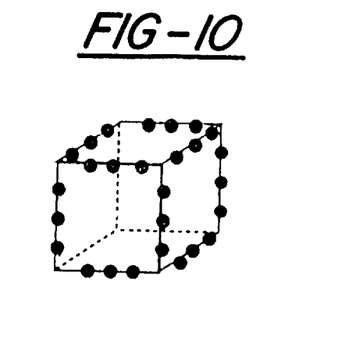
FIG. 10 is a view showing tracing points along each segment.

FIG. 10 shows the representative points on one segment. Thereafter, the treatment is performed on those representative points as tracing points. Then, each tracing point supplies the luminance information of the surface.

(3) Correlation between Frames of Tracing Points

On each tracing point of the left image, by detecting the tracing point $P_{nL}(t+1)$ for frame(t+1) from tracing points $P_{nL}(t)$ for frame(t), the correlation between frames of each tracing point is achieved. The process is hereinafter described by replacing the tracing point for frame(t) with M (model) and the tracing point for frame(t) with D (data).

(3-1) Detection of provisional tracing points.

Figure 11A:
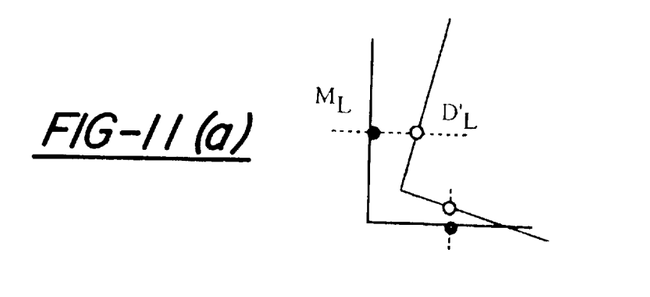
FIG. 11 is an illustrative view showing the inter-frame correlation.
Figure 11B:
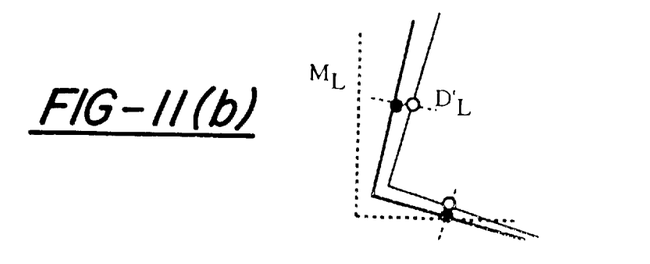

As shown in FIG. 11(a), against frame(t+1), from the position of tracing point $M_L$ for frame(t), a picture element luminance value is applied in the direction perpendicular to the edge. Subsequently, from the picture element luminance value, a luminance component is obtained, the differential value of each point is calculated to detect the portion forming the peak of the differential value. Then, at each peak point, the direction of the edge is detected. This is represented, based on luminance picture element value of 5×5 elements, by the directional codes divided in sixteen directions. Then, at each peak point, based on the correlation between tangent direction (gradient) of the tracing point for frame(t) and luminance (brightness) of the surface, the similarity between frames, and a peak point having a good score is nominated as a provisional tracing point $D'_L$.

(3-2) Three-dimensional measurement of provisional tracing point

The measurement includes a stereoscopic view and a single-eyed view.

(a) Stereoscopic view

Figure 12:
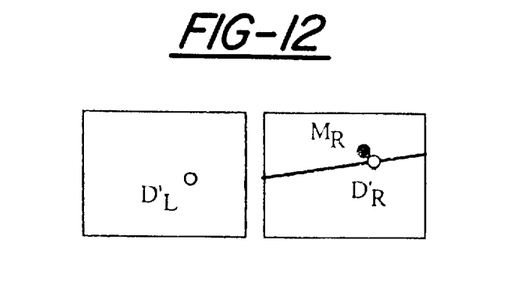
FIG. 12 is an illustrative view showing the stereoscopic correlation.

As shown in FIG. 12, the stereoscopic correlation is achieved first by obtaining the epipolar line at the right image, which corresponds to the provisional tracing point $D'_L$ of the left image, from the camera parameters Then, on the epipolar line, from the nearest point from the tracing point $M_R$ of the right image in frame(t), along the epipolar line, the inter-frame correlation between frames is obtained through the same manner as performed on the left image at the treatment (3-1) to search the provisional correlated point $D'_R$ in the right image. The thus obtained point and the provisional correlated point $D'_L$ in the left image are the stereoscopically correlated points to each other and the three-dimensional coordinates are obtained.

(b) Single-eyed view

Figure 13:
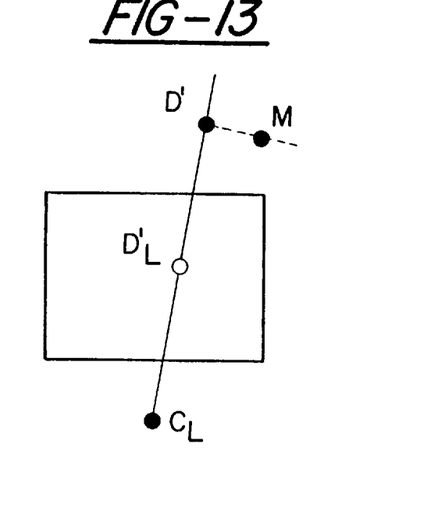
FIG. 13 is a view showing a method of approximation of the distance by means of single-eyed inspection.

As shown in FIG. 13, in the case of single-eyed view, the equation of the straight line connecting the center of lens ($X_{CL}$, $Y_{CL}$, $Z_{CL}$) and the provisional tracing point $D'_L$ on the camera projection surface is calculated from the camera parameters, and, based on the three-dimensional coordinates ($X_M$, $Y_M$, $Z_M$) of the tracing points at frame(t), the foot of the perpendicular is approximated as the three-dimensional coordinates of the tracing points at frame(t+1).

$$\frac{X_{D'L} - X_{CL}}{u} = \frac{Y_{D'L} - Y_{CL}}{v} = \frac{Z_{D'L} - Z_{CL}}{w}$$

$$X_{D'} = X_{CL} + US, Y_{D'} = Y_{CL} + VS, Z_{D'} = Z_{CL} + WS$$

-continued $$S = \frac{u(X_M - X_{CL}) + v(Y_M - Y_{CL}) + w(Z_M - Z_{CL})}{u^2 + v^2 + w^2}$$

(3-3) Calculation of kinetic parameter

From the three-dimensional coordinates D'n of the tracing points at frame(t+1) and those coordinates M'n of the tracing points for the correlated frame(t), a kinetic parameter (R:rotational, and T: translational component) is obtained by means of least square technique. In addition, Wn is a weighting term for the three-dimensional measuring error of the tracing point, with weighting from the edge direction, wherein higher as approaching the perpendicular to the epipolar line, and lower as approaching the parallel therewith.

$$\sum_{n=1}^{k} Wn\, (RM'n + T - D'n)^2$$

(3-4) Updating of provisional tracing point

Figure 11C:
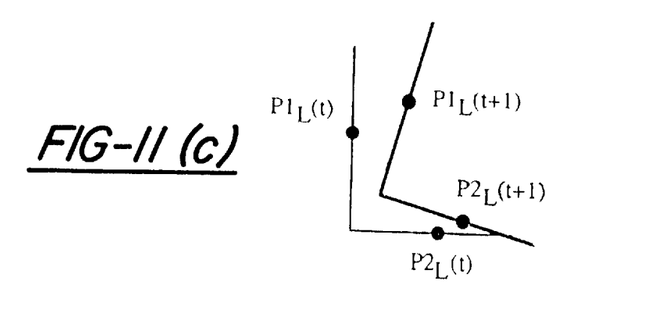

Based on the obtained kinetic parameter mentioned in preceding section (3-3) for and at frame(t), the three-dimensional coordinates of tracing points at frame(t+1) are calculated. In addition, in the case of, in comparison with the three-dimensional coordinates obtained by the three-dimensional measurement process, a tracing point having an extremely large three-dimensional distance error, because of the possibility of mis-correlation, such a point is removed and the kinetic parameter is recalculated. Based on such newly obtained kinetic parameter, the position and attitude of the object model is converted, and then the camera projection point of such point is calculated from the camera parameter. The point is updated as the new provisional tracing point (See FIG. 11(b)). Here, such treatment is repeated three times. In such a manner, coordinate transformation by the kinetic parameter is achieved, and, as shown in FIG. 11(c), the inter-frame correlation between the tracing points P1L and P2L is completed.

(4) Updating of Tracing Point Information

Since the position and attitude of an object varies according to its movement, the apex vector information possessed by the object model is updated on the basis of the kinetic parameter. Further, in the same manner as the treatment (2), the observable apex of the frame(t+1) after movement is newly selected to update the tracing point. Also, the luminance information of the surface is updated.

In summary, by repetition of the series of treatments (2) to (4) above, the position and attitude of the moving object can be detected at any time to trace the object.

Figure 14:
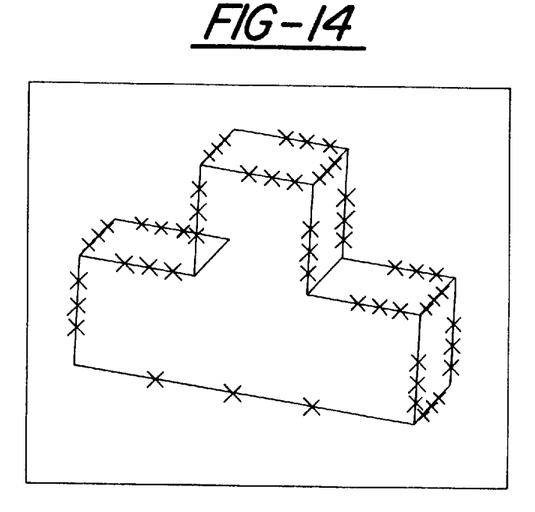
FIG. 14 is a view showing the status of tracing points.
Figure 16:
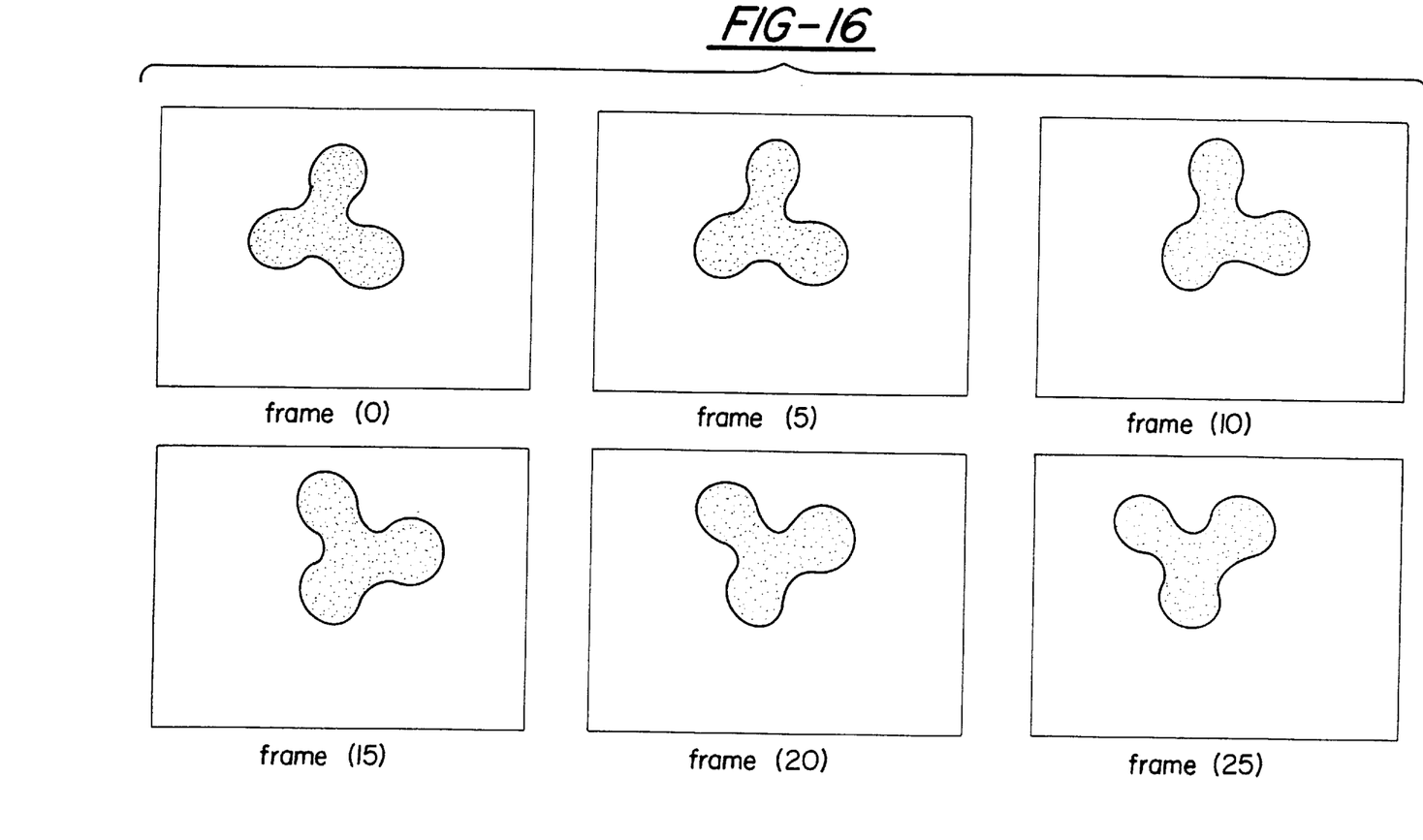
FIG. 16 is a view showing the result of tracing a figure formed of curved edges.

FIG. 14 shows the status of tracing points between frames in which the left image exists, when the object is traced on the basis of the recognition result of the traced object obtained by the scene of FIG. 3. In addition, FIG. 15 shows the steps of tracing the object at every five frames, in which the result of coordinate transformation of the object model on the basis of the kinetic parameter obtained by tracing the building blocks is illustrated as it is superimposed with the left image. Here, the solid lines therein represent the observable segments by the camera, and dotted lines represent unobservable segments. Further, FIG. 16 shows the result of tracing the figures formed of curved edges.

As discussed above, the three-dimensional motion of an object model between frames can be obtained by the steps of giving attention to tracing points along edges, taking inter-frame correlation based on the local features, and measuring the three-dimensional information of tracing points by stereoscopic correlation.

Since, for each of the correlation procedures, that is, inter-frame correlation and stereoscopic correlation, the similar methods can be utilized, the system structure is simplified and also high speed treatment is possible, because the treatment is a regular process suitable for hardware.

Also, the cost for calculation is low, and it is not necessary to store a large quantity of image data. Further, through the same treatment, any movement of an object formed by edges of not only straight lines but also including curved lines can be detected.

As discussed above, the invention provides the simplified system construction and enables a high speed treatment of various objects.

What is claimed is:

1. A method of processing image information for recognizing the movement of an object on the basis of frame images obtained in a three dimensional space in time series manner comprising the steps of:

entering a stereoscopic frame image of the object;

extracting edges of the object from the stereoscopic image;

locating characteristic points on the edges from the stereoscopic image;

determining local features of the edges from the stereoscopic image;

on the basis of the local features from the stereoscopic image dividing the edges into a plurality of segments, storing the segment information into a boundary representation model data structure;

with reference to characteristic points, selecting tracing points on the segments;

determining a three-dimensional correlation of the tracing points between frames of the tracing points; and detecting position, attitude and a kinetic parameter, the kinetic parameter consisting of a rotational component and a translational component, of said object on the basis of the three dimensional coordinates of said three-dimensional correlated point.

2. A method according to claim 1, wherein said inter-frame correlation is performed by evaluating the similarity between frames on the basis of correlation between the tangential direction of said tracing point and the luminance value of the surface.

3. A method according to claim 1, wherein said three-dimensional coordinates of said correlated point are measured by means of stereoscopic viewing using stereoscopic correlation.

* * * * *